FIG.1

INVENTOR.
REYNOLD B. JOHNSON

Jan. 11, 1955

R. B. JOHNSON 2,699,111

PUNCHED CARD INTERPRETER

Filed May 31, 1951

INVENTOR.
REYNOLD B. JOHNSON
BY Robert S. Dunham

ATTORNEY.

FIG. 4

INVENTOR.
REYNOLD B. JOHNSON
BY Robert S. Dunham
ATTORNEY.

FIG. 5

INVENTOR.
REYNOLD B. JOHNSON
BY Robert S. Dunham
ATTORNEY.

United States Patent Office 2,699,111
Patented Jan. 11, 1955

2,699,111

PUNCHED CARD INTERPRETER

Reynold B. Johnson, Binghamton, N. Y., assignor to International Business Machines Corporation, New York, N. Y., a corporation of New York Application May 31, 1951, Serial No. 229,054

6 Claims. (Cl. 101—93)

This invention relates to a device for sensing perforations in a statistical record, interpreting such perforations as to numerical, alphabetic or other value, and printing the interpreted intelligence along one edge of the record.

A statistical record such as used in punch card accounting systems and the like has a plurality of columns, for example eighty, in each one of which may be a perforation representative of a numerical value or two or more perforations representative of an alphabetic character or sign. There have been provided heretofore mechanisms for interpreting perforations in statistical records, and converting such interpreted information into printed form. On the whole these prior devices have been fairly complicated, and most of them have involved electrical control systems. It is, therefore, the principal object of this invention to provide a mechanical, perforated statistical record interpreter which may be produced at relatively low cost. A common form of perforated record body with which the invention is operative is a punched card to which reference will be made herein for purpose of concrete illustration.

In its broad aspect the interpreting mechanism herein functions to check a moving character element according to the location of a card perforation locating means such as a sensing wire or pin extending through a hole or holes in a punched statistical card. There is provided a plurality of pin sensing blades which are adapted to contact perforation sensing and locating pins or wires protruding through a punched card hold, and these blades in turn control interposers which check the movement of the character elements and cause them to stop in a printing position which is directly related to the card hole being sensed.

The principle of checking a character element by means of a single pin or wire extending through a hole in a card is sufficient for interpreting a numeric value punched in the card. Interpreting a card having a plurality of holes punched in a single column as in alphabetic character coding, necessitates an expansion of the function of the pin sensing blades and the modified displacement of the character element accordingly.

A mechanism designed to interpret single, dual or triple card holes in effect divides the numeric positions of the card into three adjacent, aligned groups with a separate sensing blade for each group. Thus, one blade may be adapted to sense numeric card positions 9 through 4, a second blade may be adapted to sense numeric card positions 4 through 1, and a third blade may be adapted to sense card positions, 10, 11 and 12.

The suggested sensing divisions are based on a conventional three-hole coding system which contemplates not more than a single card hole in each of the three sensing divisions. Thus, for a percentage sign (%), three holes may be currently punched in the card at the 11, 8 and 3 index point positions, for example. In sensing this character, each hole is sensed by a different one of the three sensing blades operating in connection with a single card column.

For an alphabetic character such as "G" represented, for example, by card holes at its 12 and 7 index point position, the 12 hole would be sensed by one sensing blade while the 7 hole would be sensed by a second blade. The third sensing blade would be unaffected while sensing, although operating through a normal sensing cycle. By the same token, when a single numeric hole is sensed by one of the blades, the two other blades are unaffected while moving through the sensing cycle.

With this general description of the purpose and operation of the mechanism, it is appropriate to examine the matter in greater detail by reference to the following drawings in which like reference numerals indicate like parts and in which.

Figure 2:
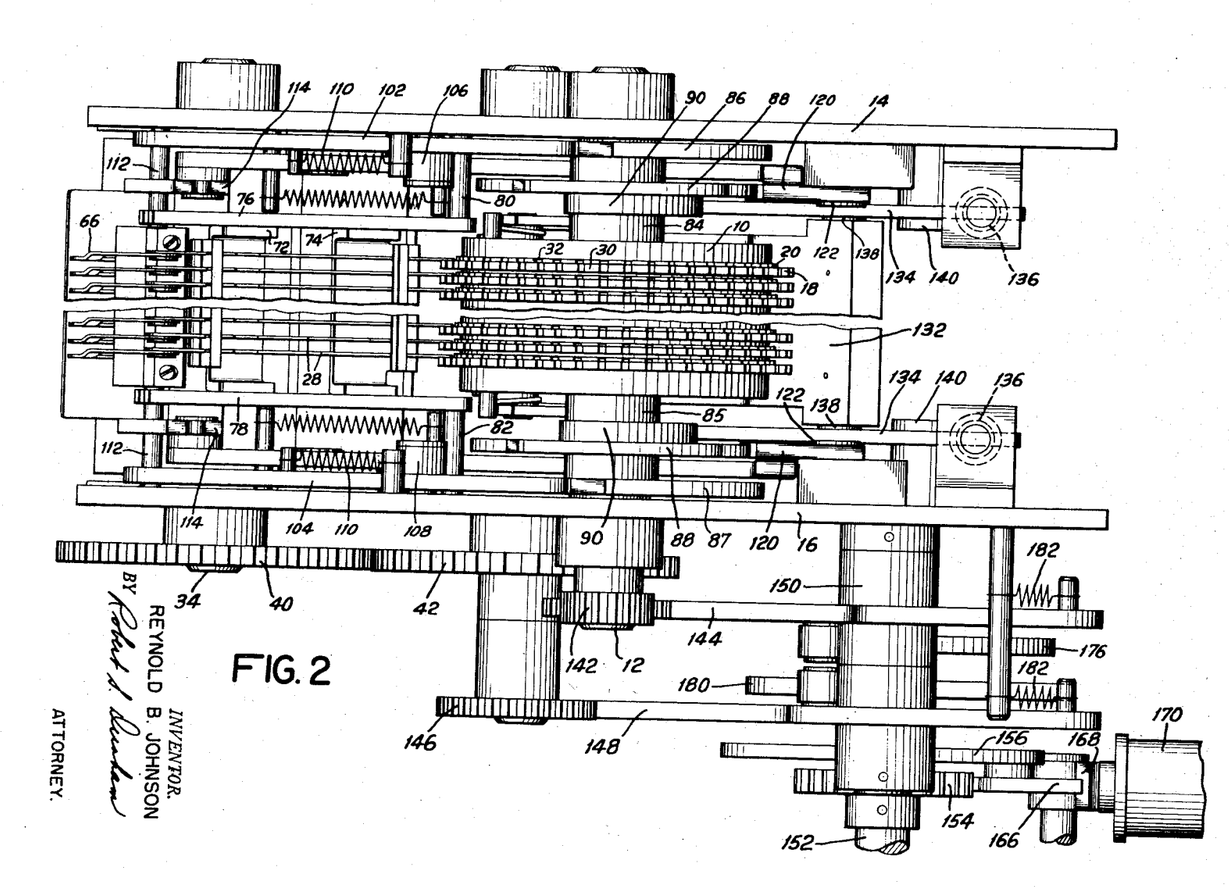
Fig. 2 is a plan view on line 2—2 of Fig. 1 of the mechanism, the longitudinal, central portion being broken away to reduce the figure.

With principal reference to Fig. 2, it will appear that the mechanism includes a grooved cylinder 10, fixed for rotation on a shaft 12 which is journalled in side frames 14 and 16.

Loosely mounted on the cylinder 10 are a plurality of split character rings 18. In the present construction the character rings 18 are spaced along the periphery of the cylinder 10 to provide for the designed capacity of the interpreter. If the statistical card to be processed in the machine has, for example, eighty columns, there will be provided eighty character rings. For whatever card size, the number of character rings will correspond to the number of card columns. Each of the rings has a laterally extending collar 20 having therein notches 32 corresponding to the character positions in the face of the ring. The notches 32 are designed for engagement by an interposer under the control of a plurality of sensing blades 22, 24 and 26, best shown in Fig. 4 of the drawings. Herein a set of three sensing blades is provided for each card column, and each blade individually or the three blades jointly control the position of an interposer 28 adapted to control the position of its related character ring 18 by engaging the free end thereof with one of the notches in the ring collar 20.

Each character ring has the required numeric, alphabetic and special character figures embossed on its periphery in agreement with the angular displacement of the character ring from a cycle start position, as related to the travel of the sensing blades 22, 24 and 26 from the same cycle start position. The relative travel of the sensing blades 22, 24 and 26 and the character ring 18 is four units of the ring to one numeric division of the card for the 9-8-7-6-5 group of card positions and the 4-3-2-1 group of card positions, and one unit of the ring to one numeric division of the 10-11-12 group of card positions. There is an additional displacement of sixteen units of the ring between the sensing of the 9 to 5 group and the 4 to 1 group. There is also a further displacement of a single unit between sensing the 9 to 5 group and the 4 to 1 group and the 10 to 12 group to permit a sensing shift as shall be described at a later point.

The character rings 18 are embossed with characters 30 at six degree intervals with the corresponding detent notches 32 in the ring collar 20. The character rings 18 are slit at one point in their circumference to permit expansion for assembly of the rings on the cylinder 10 and to provide a frictional drag against the cylinder 10. The frictional mounting of the character rings is such as to cause the rings to rotate with the cylinder 10 until a ring is checked by its interposer 28, at which time the frictional mounting of the rings on the cylinder permits continued rotation of the cylinder while such checked ring is held against movement.

Figure 4:
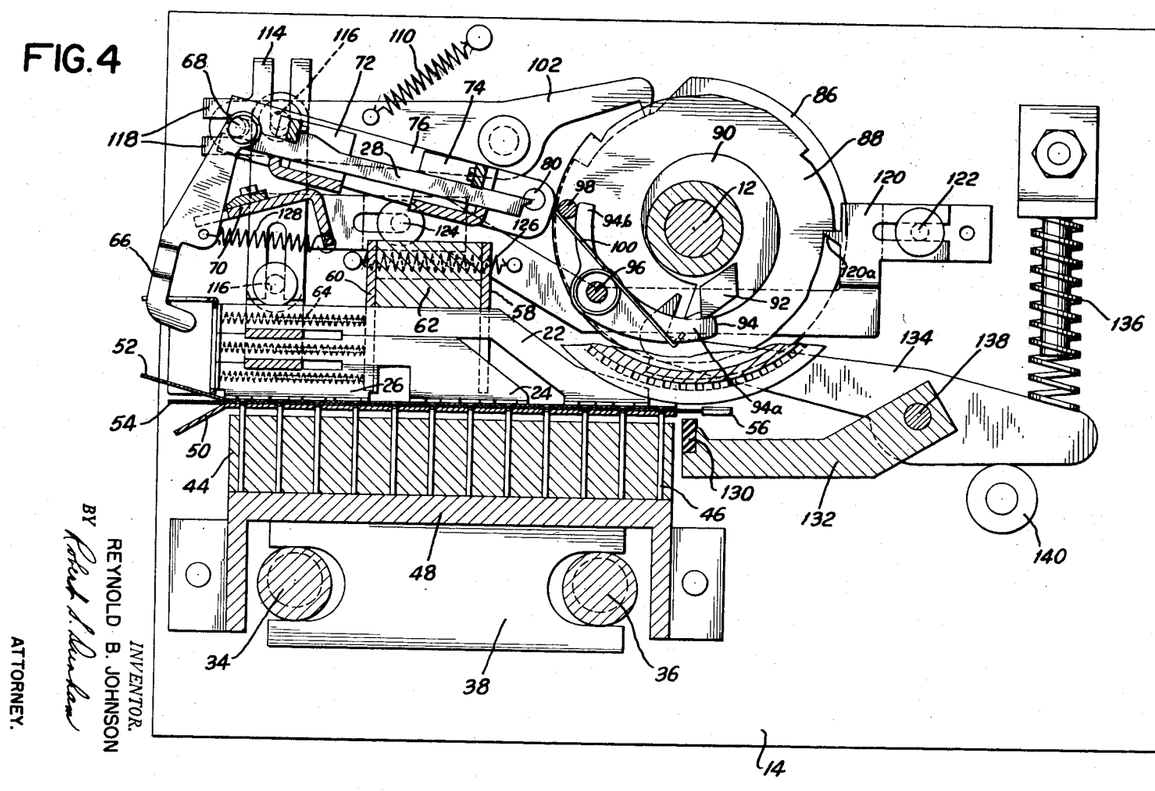
Fig. 4 is a cross-sectional view on line 4—4 of Fig. 3.
Figure 5:
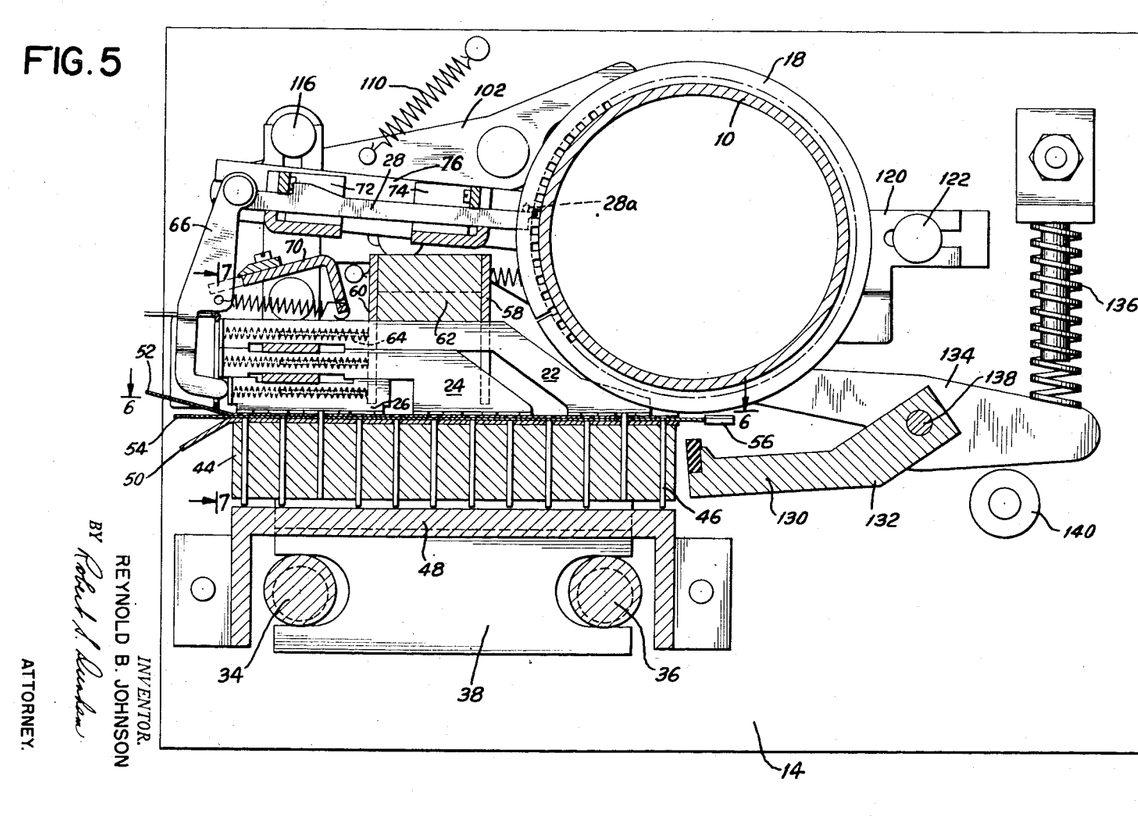
Fig. 5 is a cross-sectional view on line 5—5 of Fig. 3.

In order to render the mechanism responsive to the perforations in a record card, there has been provided herein means for locating a record card in a card receiving station provided with means for projecting a wire or pin through card perforations. Figs. 4 and 5 show a pair of eccentric shafts 34 and 36 journalled in the side plates 14 and 16 for the support of a pair of cam blocks 38. The shafts 34 and 36 are driven from a source of power, as to be described later, through a pair of gears 40 and 42 fixed to the shafts 34 and 36, respectively. During rotation of the shafts 34 and 36, and due to the eccentricity thereof, the cam blocks 38 will be reciprocated, i. e. raised toward the perforation sensing station and lowered away from it.

Fixed to the cam blocks 38 is a wire sensing plate 44. This plate mounts for sliding movement therein a plurality of pins 46, one such pin being provided for each index point of a card to be interpreted in the mechanism. Herein there are 960 such pins aligned in eighty rows of twelve pins each. These pins correspond to the twelve index point positions of the card and the eighty card columns. Each pin is mounted in the sensing plate 44 for sliding movement in the plate. There is sufficient frictional contact between the pins and the plate so that the plate will carry the pins with it as it moves upwardly until an unperforated point of a card is encountered, whereupon movement of the pin ceases while the plate continues to advance to carry pins in registration with a card perforation through such perforation.

In the illustrated embodiment of the invention the first five pins reading from left to right in Figs. 4 and 5 represent respectively the 9, 8, 7, 6 and 5 index point positions of a card. The next four pins from left to right represent, respectively, the 4, 3, 2 and 1 index point positions, while the last three pins at the right of these figures represent, respectively the 10 (or zero), 11 and 12 index point positions of a card.

In Fig. 4 of the drawings the mechanism is shown at rest with the wire sensing plate 44 in contact with a pin reset plate 48. In this position of the wire sensing plate each of the pins is in a projected position in respect to the carrying plate. In the position of rest shown in Fig. 4 of the drawings, the upper ends of the pins 46 extend into corresponding passages formed in the bottom one of a pair of card plates 50 and 52 between which a statistical card 54 is adapted to rest during the interpreting function of the device. The upper card plate 52 has passages therein for the pins 46 which are in registration with the corresponding passages in the bottom card plate 50. As a function of this structure, when a card 54 is positioned between the card plates 50 and 52, with the upper edge of the card resting against a stop 56, the pins 46 will be in alignment with the corresponding index point positions of the card. Under such conditions when the shafts 34 and 36 are rotated so that the card sensing block 44 is elevated, any of the pins 46 that find a card perforation will pass through such card perforation, through the corresponding passage in the upper card plate 52 and project upwardly into the path of the respective card sensing blades 22, 24 and 26. For example, in Fig. 5 of the drawings, the card column through which the section is drawn is shown as containing two perforations. One of these is at the 7 index point position of the card which permits passage of the third sensing pin while the other is at the 11 index point position of the card, permitting the passage of the 11th pin. It will be observed from an examination of Fig. 5 that the remaining pins were blocked by unperforated card index points and consequently these pins occupy a downwardly displaced position in respect to the pin sensing block 44. At the end of the sensing cycle, the pin sensing block 44 is lowered and contact between the lower end of the pins therein and the pin restoring plate 48 will restore the pins within the block for the next cycle of operation.

Figure 6:
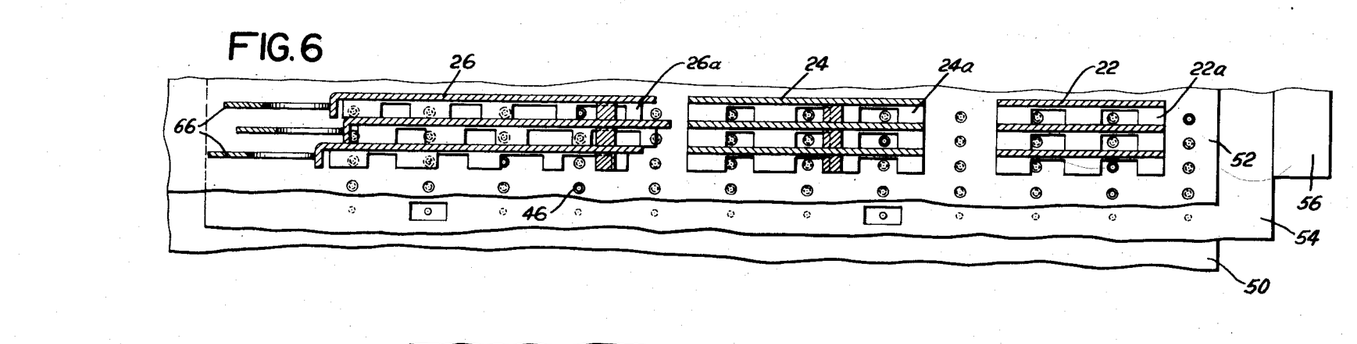
Fig. 6 is a view on line 6—6 of Fig. 5.
Figure 7:
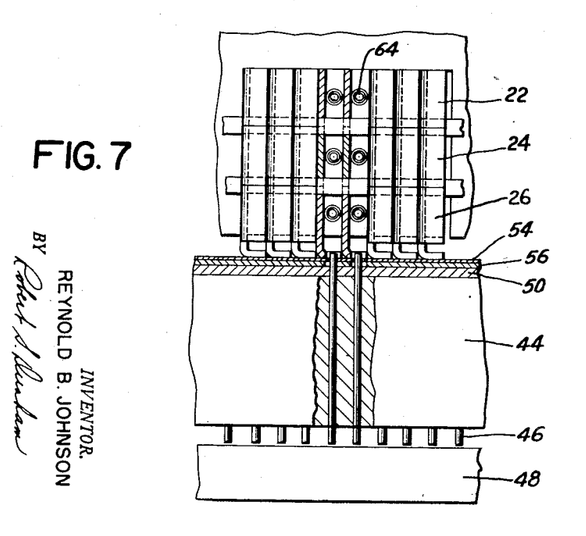
Fig. 7 is a view on line 7—7 of Fig. 5.

In order to sense which of the sensing pins 46 have penetrated a card hole and to stop rotation of the proper character ring in a position corresponding to the sensed digit holes, the pin sensing blades 22, 24 and 26 are reciprocated until they contact a pin projecting from the upper face of the card plate 52. Herein the sensing blade 22 is designed for control by a projecting pin in the last three positions to the right in Fig. 4 of the drawings. The sensing blade 24 is adapted for control by the next four pins reading from right to left in Fig. 4, while the sensing blade 26 is adapted for control by the five pins at the left in Fig. 4. By reference to Fig. 6 of the drawings it will be noted that each of the pin sensing blades has a laterally extending foot 22a, 24a and 26a, respectively. These feet are slotted to embrace the pins in their control groups. Furthermore, the slots are so proportioned in repect to the pin positions that a projecting pin will be sensed at the proper point in the sensing cycle. As seen in Fig. 6 of the drawings the pin positions at the left of each group are sensed first and each succeeding position to the right is thereafter sensed in successive order. It follows, of course, and it will be more fully pointed out hereinafter that when a pin is encountered in any position further advance movement of the sensing blade will be prevented. As hereinabove pointed out a single sensing blade is sufficient for sensing numeric values represented by a single card perforation, two sensing blades are required for the sensing of values, such as alphabetic notations, represented by two perforations in the same column, and three blades are required for the sensing of coded values employing three perforations in a single column. It is also evident that only a single perforation may appear in any one of the three zone groups.

The sensing blades 22, 24 and 26 are slidably mounted in slots of a pair of spaced guide combs 58 and 60, attached to opposite faces of a fixed support 62. The blades are normally maintained in their extreme left position, as shown in Fig. 4 by means of springs 64.

For each set of three sensing blades 22, 24 and 26 there is provided a sensing finger 66 which is pivotally joined to its interposer 28 by means of a pivot stud 68. The sensing fingers 66 are slidably supported in slots of a guide bail 70, while the interposers 28 are slidably supported in a set of spaced guide bars 72 and 74 which are mounted on a pair of interposer arms 76 and 78, these arms being supported for rocking motion on pivot studs 80 and 82, respectively.

The free end of the sensing finger 66 is adapted to contact the sensing blades 22, 24 and 26 in succession and drive the blades across the card plate 52 as the pivot arms 76 and 78 and the guide bail 70 are positioned, as will be described later, to align the free end of the sensing fingers with the respective sensing blades under the control of each thereof.

As best shown in Fig. 2 of the drawings there is mounted for free rotation at each end of the shaft 12 a pair of cam hubs 84 and 85, to which are attached finger positioning cams 86, a pair of pin sensing cams 88 and a pair of print cams 90. As best seen in Figs. 2 and 4 of the drawings, the print cams 90 have attached to the face thereof a pawl latch 92 which is adapted for engagement by drive pawls 94 carried by the ends of the cylinder 10. The drive pawls 94 are mounted for rocking movement on cylinder carried pivot studs 96. Each pawl has a forwardly extending end 94a adapted to engage a face of its pawl latch 92 and a rearwardly extending end 94b adapted to engage a cylinder carried stop stud 98 under the influence of a spring 100 which normally tends to rock the pawl 94 in a counterclockwise direction.

When the pawl latches 92 and the drive pawls 94 are angularly displaced in respect to each other, as by rotation of the cylinder 10 in a clockwise direction while the print cam 90 is at rest, the end 94a of each pawl 94 will be rocked upwardly under the influence of its spring 100 to engage that end of the pawl behind its pawl latch 92. Thereafter counterclockwise rotation of the cylinder 10 will serve to rotate the print cams 90 and the associated pin sensing cams and finger positioning cams.

Adapted to cooperate with the finger positioning cams 86 are a pair of follower arms 102 and 104 pivotally mounted on the side plates by means of pivot hubs 106 and 108, respectively. The follower arms 102 and 104 are urged into contact with the periphery of the finger positioning cam 86 by means of springs 110. Each of the follower arms 102 and 104 has an inwardly extending stud 112 which engages in slots at the end of the pivot arms 76 and 78.

The foregoing structure controls the position of the sensing fingers 66 in respect to the several sensing blades 22, 24 and 26. The finger positioning cams 86 are so designed that upon initial counterclockwise movement thereof the follower arms 102 and 104 are rocked about their respective pivots 106 and 108 in a counterclockwise direction to such extent that the free ends of the sensing fingers 66 are in alignment with the sensing blade 26. During further counterclockwise movement of the finger positioning cams 86 the follower arms will fall into a lower cam dwell, thereby rocking the follower arms 102 and 104 in a clockwise direction about their pivot points to align the free end of the sensing fingers with the sensing blades 24. Finally, before the end of the counterclockwise rotation of the finger positioning cams 86, the follower arms 102 and 104 will drop into a still lower cam dwell, thereby rocking the arm sufficiently to elevate the sensing fingers into alignment with the sensing blade 22.

It has been shown how the guide bail and its associated sensing fingers are moved successively to bring the fingers into alignment with the several sensing blades. It is also necessary that the guide bail 70, which constitutes the normal pivot point for the sensing finger 66, must be moved in unison with the pivot arms 76 and 78 and their associated guide bars 72 and 74. To achieve this function the guide bail is fixed at its ends to a pair of drop bails 114 which are slotted inwardly from each end thereof to permit their restrained movement by a pair of guide studs 116. The drop bails 114 have forwardly projecting guide fingers 118 which between them form a slot for the accommodation of the studs 112 of the follower arms 102 and 104. Accordingly, whenever the finger positioning cams 86 are operated to swing the pivot arms 102 and 104 about their pivots, engagement of the pins 112 in the slot formed by the fingers 118 of the drop bails 114, the guide bail 70 will be moved in the same direction and a corresponding distance.

In order that each of the sensing blades 22, 24 and 26 may be actuated to traverse their respective pin sensing zones, there is provided herein mechanism for moving the several sensing blades to the right as viewed in Figs. 4 and 5 against the tension of their springs 64 whenever the sensing fingers 66 are brought into alignment with the blades. To this end there is provided a pair of control arms 120 which have a projection 120a constituting a follower for the pin sensing cams 88. The control arms are guided for reciprocating movement on guide studs 122 to the rear of the cylinder 10 and 124 at the front of the cylinder 10.

The forwardly disposed ends of the control arms 120 are in the form of a T. The head of the T mounts the studs 116 and constitutes a support for the drop bails 114. By virtue of this connection between the control arms 120 and the drop bails 114 to which the guide bail 70 is attached, the free inturned ends of the sensing fingers 66 are carried into actuating contact with the sensing blades 22, 24 and 26.

It has been noted hereinbefore that the sensing fingers 66 are initially aligned with the lower sensing blade 26. Thereafter, they are elevated into alignment with the sensing blade 24 and finally they are further elevated into alignment with the sensing blade 22. In each of these positions, the pin sensing cams 88 will operate the control arms 120 rearwardly or to the right as viewed in Figs. 4 and 5, the sufficient distance to move the respective sensing blades through their respective pin position zones. Furthermore, the pin sensing cams 88 are so designed as to permit the return of the control arms 120 to their normal, forwardly disposed position under the influence of springs 126 during transfer movement of the sensing finger 66 from one of the sensing blades to another.

Each of the sensing fingers 66 is spring-biased against the guide bail 70 by means of an associated spring 128 which interconnects the sensing finger and the guide bail. The strength of the spring 128 is quite sufficient to permit a sensing finger 66 to move any one of the sensing blades through a pin sensing cycle. However, whenever a sensing blade in motion encounters a projecting pin, the sensing finger 66 operating thereon will yield against the tension of its spring 128 even though the control arms 120 have not carried the sensing pins through their complete cycle.

So long as the free ends of the sensing fingers 66 are able to move a related sensing blade through a pin sensing cycle without encountering a projected pin, the finger biasing springs 128 will hold the sensing fingers against the guide bail 70 with the result that no forward movement of the related interposer 28 will take place. However, as soon as a sensing blade encounters a projecting pin, the point of contact between the sensing finger and the sensing blade will become a pivot point as the guide bail 70 continues to move inwardly. Thereupon a spring 128 controlling a sensing finger will project the associated interposer 28 forwardly so that its free end will enter one of the slots 32 of the related character ring 18 and block such ring against further rotative movement, although as pointed out hereintofore the cylinder 10 will continue to rotate. Blocking relation between an interposer 28 and its related character ring will be maintained during the remainder of the sensing cycle for the particular sensing blade that has encountered a pin within the pin zone under its control. As the sensing fingers are shifted to the next succeeding sensing blade, any interposer engaged with its character ring will be withdrawn and the ring will again resume synchronous rotation with the cylinder until a pin is encountered in such following zone sensing cycle.

With the foregoing in mind, it is appropriate to describe a complete interpreting cycle of the mechanism, and to this end let it be assumed that the cylinder 10 and the cams 86 and 88 as well as the character rings 18 are in a cycle start position. As the cylinder 10 and the related units, including the character rings and the finger positioning and pin sensing cams, advance in a counterclockwise direction from the cycle start position, the follower arms 102 will be pivoted in a counterclockwise direction by the cams 86, thereby causing the studs 112 to force the arms 76 and 78 together with their guide bars 72 and 74 in a counterclockwise direction to bring the sensing finger 66 in a position of alignment with the sensing blade 26.

As the cylinder 10 continues to advance in a counterclockwise direction, the control arms 120 will be cammed toward the right in Figs. 2 and 4 by the pin sensing cams 88, thereby causing the drop bails 114 to move toward the right. As a result the sensing finger 66 will press the sensing blade 26 toward the right to sense the 9, 8, 7, 6 and 5 card positions. The blades 26 progress from the 9 position through the 5 position of the card, while the cylinder 10 is moved through twenty units or 120°. At this point the sensing blades 26 are at the end of their stroke and remain stationary, but the cylinder 10 continues to advance another sixteen units or 96°.

As the cylinder advances another unit or six degrees, the control arms 120 will drop into the first low point on the cams 88, thereby moving toward the left and permitting the blades 26 to restore under the influence of their springs 64. When the follower arms 102 drop into the first low spot on the cams 86, the springs 110 will rock the follower arms 102 and 104 in a clockwise direction. As a result of this movement, the sensing fingers 66 will move to the left and upwardly as viewed in Figs. 4 and 5 into a position in alignment with the sensing blades 24. During the next portion of the cycle, the 4, 3, 2 and 1 numeric positions of the card will be sensed during the advance of the cylinder 10 through the next sixteen units or 96°. At the end of this period the follower arms 102 and 104 will drop into a deeper dwell in the cams 86, and a similar shift of the sensing fingers will take place to align the sensing fingers with the sensing blade 22 for sensing the 10, 11 and 12 positions of the card. This latter shifting movement takes place during one unit or 16° travel of the cylinder 10. The cylinder 10 advances only three units or 18° as the 10, 11 and 12 positions of the card are sensed, after which the cylinder moves an additional unit or 6°, which is effective to engage all of the interposers 28 with the notches 32 in their associated character rings. In this latter position the interposers insure accurate alignment of the character rings for printing which will be described at a later point.

It was presumed in the foregoing example that none of the sensing blades encountered pins extending through card perforations. This would be the situation if an unpunched card were inserted between the card plates 50 and 52. The position of the character rings 18 in relation to the cylinder 10 under this condition is a displacement of one unit or 6° from the start position, this displacement being caused by the interposer engagement during the six degrees of alignment at the end of the sensing cycle.

To resort to a concrete example in which punched holes of a card are to be interpreted, and for the purpose of rendering clear the operation of the device, let it be assumed that an 8 hole is present in a card being interpreted. Under these conditions the sensing pin 46 corresponding to the perforated 8 hole in the card will be extended through the card perforation, the upper card plate 52 and into the path of the sensing blade 26. As the cycle begins there is no displacement between the cylinder 10 and the character ring 18 until the sensing blade 26 engages the pin extending through the 8 hole of the card. Upon contact between the sensing blade 26 and the extending pin, the sensing finger 66 associated with that particular sensing blade will be pivoted in a clockwise direction, thereby projecting the associated interposer 28 into blocking engagement with the related character ring 18. Since the cylinder continues to advance, the engaged character ring and cylinder will be displaced until the sensing finger 66 is released from contact with the sensing blade 26. Thus, the character ring will be held stationary through four units for each of the 8, 7, 6 and 5 pin positions and the additional sixteen units of travel after the 5 sensing position. This is an aggregate of thirty-two units, plus one aligning unit, or a total of thirty-three units (198°) of displacement between the start position of the ring and cylinder and the print position of the selected characters.

In a card column where the #2 hole is punched, there will be no displacement between the ring and the cylinder until the sensing blade 24 comes into engagement with the extended pin at the #2 pin position. Displacement between the cylinder and the ring takes place through the 2 and 1 positions, causing an eight units displacement plus one unit displacement during alignment which is equal to nine units or 54° displacement between the cylinder and the character ring relating to the blade sensing the #2 hole.

In multiple hole columns, as when the 11-8-3 index points are punched for example, to represent the percent sign (%), the sensing blade 26 checks its associated character ring at the #8 hole whereafter the ring and cylinder are displaced relative to each other four units each for the 8, 7, 6, 5 numeric position plus the sixteen additional units after the 5 position, making a total of thirty-two units. Since the sensing blades are restored and the sensing fingers shifted after each of the three sensing blades has performed its function, the cylinder and ring again advance together at a displacement of thirty-two units or 192° during the shifting of the sensing fingers 66 from the sensing blades 26 to the sensing blades 24. An associated character ring 18 is again held by its interposer 28 when the sensing blade 24 engages the pin extending through the #3 card hole. While so held, the character ring and cylinder will be displaced four units each for the 3, 2, 1 numeric position. The sensing blade 24 is then restored and the sensing fingers 66 are again shifted to bring them into alignment with the sensing blade 22 for the purpose of sensing the 10, 11, 12 card positions. The relative ring and cylinder displacement at the beginning of the 10-12 group sensing is 264° (thirty-two units by the #8 pin, plus twelve units by the #3 pin which equals forty-four units or 264°).

During the sensing of the 10, 11, 12 pin positions the character ring 18 is again locked when the sensing blade 22 engages the pin extending through the card perforation at the 11th index point position. This causes an additional displacement between ring and cylinder during the 11 and 12 sensing positions. Since the zone holes, i. e. the 11 and 12 positions, are spaced but a single unit, the displacement through these positions is only two units or twelve degrees. The interposer will remain in engagement with the character ring during the one unit displacement travel of the cylinder.

The total displacement between the particular character ring under discussion and the cylinder at the print position demanded by the 11-8-3 punched hole combination is, therefore, thirty-two units, plus twelve units, plus two units, plus one unit for alignment, which equals forty-seven units or 282°.

The character rings 18 are positioned over the inner edge of a card between the card plates 50 and 52, and when the mechanism is operated as hereinbefore described, the characters of the several rings representative of data punched in any of the card columns will be in proper alignment for the simultaneous printing of all interpreted characters across the top of the tabulating card. The printing is effected by means of a rubber platen hammer 130 (Figs. 4 and 5) which is adapted to strike the back of the card 54 with sufficient force to make an impression from a transfer ribbon interposed between the card and the character rings.

The rubber platen 130 is mounted on the free end of a hammer lever 132, which is attached to a pair of cam followers 134 which are urged to ride the periphery of the print cams 90 by associated springs 136, the movement of the followers 134 being about associated pivot studs 138. As the print cams 90 revolve in a counterclockwise direction, the followers 134 and the hammer lever 132 are cammed away from the character rings against the force of the springs 136. As the followers 134 pass the high spot of the print cams 90, there is presented in the cam peripheries an abrupt drop which will permit the springs 136 to snap the followers 134 with the consequence that the platen 130 will be driven against the back of the card 54 to effect printing from the aligned characters 30 of the character rings 18. Clockwise movement of the followers 134 about the pivot studs 138 is limited by a pair of stop members 140.

During resetting rotation of the cylinder 10 a pin 28a projecting laterally from each of the character rings will contact the related interposers 28 and align all of the rings at a cycle start position.

Figure 1:
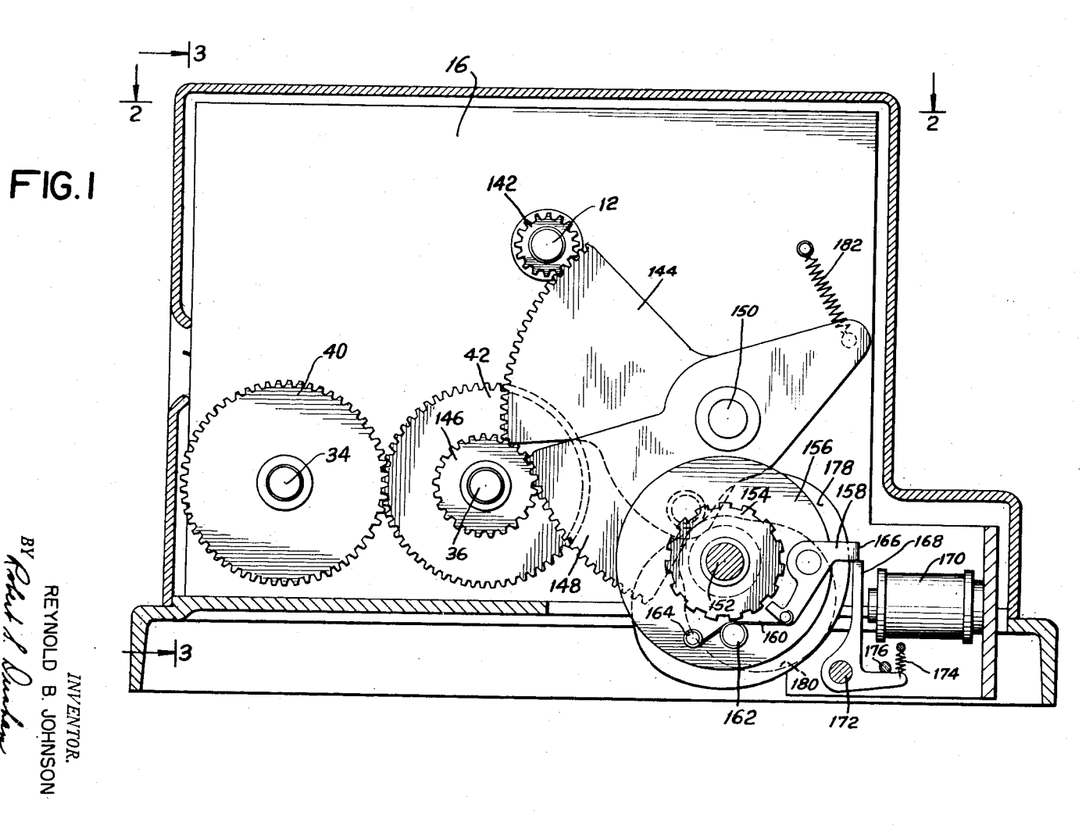
Fig. 1 is an end, elevational view of the interpreter and of a casing partially removed therefrom to show drive mechanism.
Figure 3:
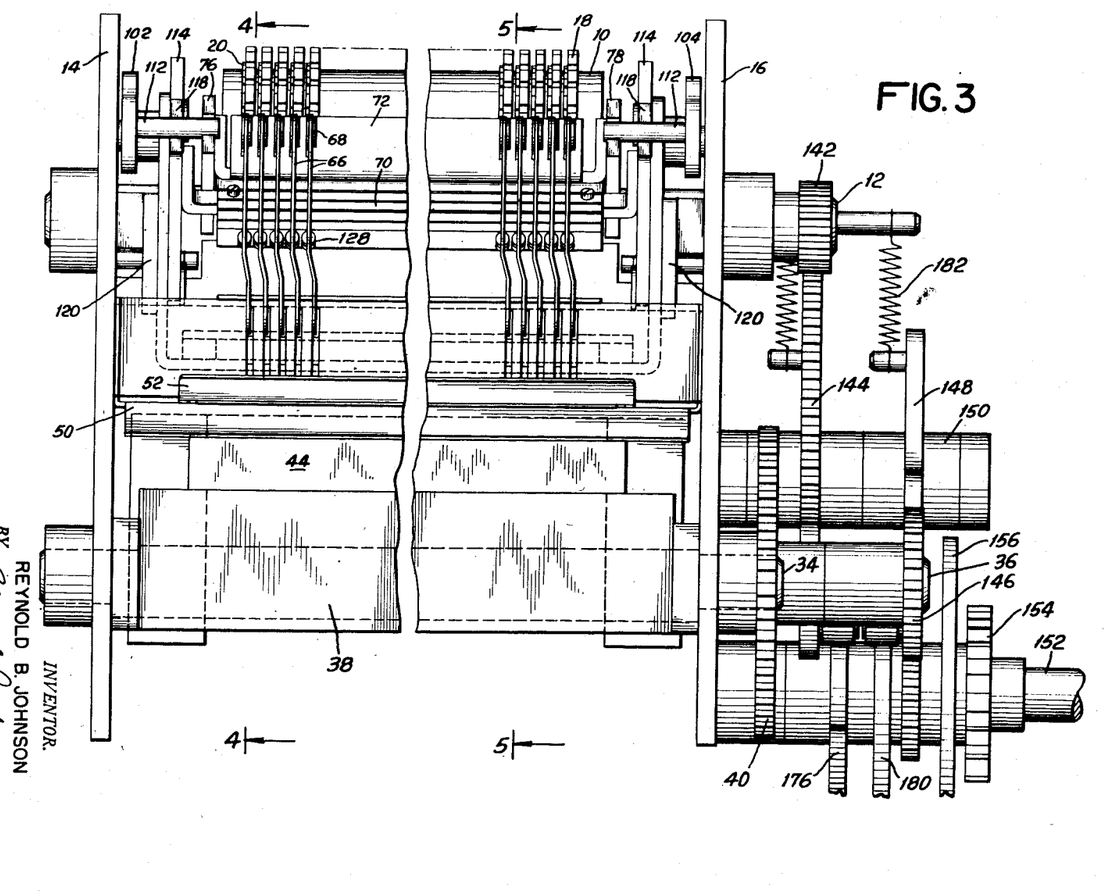
Fig. 3 is a front, elevational view on line 3—3 of Fig. 1 with the longitudinal, central section broken away to reduce the size of the figure.

Figs. 1, 2 and 3 of the drawings illustrate the manner in which the device may be operated through interpreting cycles. One end of the drum shaft 12 has a pinion 142 affixed thereto. A gear sector 144 cooperates with the pinion 142 to drive the drum 10 counterclockwise and then clockwise through 360° in each direction. A pinion 146 is fixed to one end of the eccentric shaft 36, it being remembered that the eccentric shaft 36 is one of the two such shafts provided for actuation of the cam blocks 38 connected with the wire sensing plate 44. A gear sector 148 is engaged with the pinion 146 to operate the eccentric shaft 36 counterclockwise and then clockwise through 180°. Inter-engagement between the gears 40 and 42 imparts the same degree of movement to the eccentric shaft 34. Both gear sectors 144 and 148 turn about a rock shaft 150 and are operated by cams attached to a one-revolution clutch unit.

A motor (not shown) is adapted to turn a drive shaft 152, to one end of which is attached a clutch ratchet 154. Mounted for rotation on the drive shaft 152 is a clutch disc 156 on which is pivotally mounted a clutch pawl 158. The clutch pawl is normally urged for engagement with the clutch ratchet 154 by a spring 160 supported by studs 162 and 164 extending from the face of the clutch disc 156. A rearwardly extending arm 166 of the clutch pawl 158 is adapted to contact a pawl latch 168, which constitutes the armature of a magnet 170. The clutch pawl latch 168 is mounted for rocking movement about a pivot stud 172, in one direction under the influence of the magnet 170 and in the other direction under the influence of a spring 174. The rocking movement of the latch 168 under the influence of the spring 174 is limited by a stop 176.

It will be seen, therefore, that when the magnet 170 is energized the pawl latch 168 will be attracted thereto and release the clutch pawl 158 for engagement with the clutch ratchet 154. As a consequence, the clutch disc 156 will be driven under the influence of the rotating power shaft 152.

Attached to the clutch disc 156 are a pair of cams controlling the movement of the gear sectors 144 and 148. A cam 178 controls the movement of the sector 148, while a cam 180 controls the movement of the sector 144. The sectors are held against the cam surfaces by suitable springs 182.

It is contemplated that the magnet 170 be in an electrical control circuit which is closed each time a card is properly positioned between the card plates 50 and 52, whereby the same is momentarily energized to release the clutch pawl 158 for a single revolution of the clutch disc 156 each time a card is properly inserted into the mechanism.

The foregoing description is that of a single embodiment of the invention which is according to the card sensing and interpreting principles taught herein. The scope of the invention is set forth in the following claims.

I claim:
1. In a device for interpreting records having an array of perforations formed therein, first and second guide means forming a slot to receive a perforated record, said guide means having aligned openings adapted to coincide with the array of perforations in a record, sensing means for sensing the perforations in a record positioned in said guide means, said sensing means comprising a bodily reciprocable block yieldingly holding sensing pins at one side of said first guide means, said pins being aligned with the openings in said guide means and being adapted to protrude through aligned openings of said guide means when a record perforation coincides therewith, said sensing means further including means at the outer side of said second guide means adapted to traverse said second guide means and having portions cooperating with the raised sensing pins in the block, said pins being adapted to be moved with respect to the bodily reciprocable block when no record perforations are coincident therewith, a movable printing device having a plurality of printing characters thereon positioned adjacent the innermost end of said slot and in confronting relation with a part of the inner end of an inserted record and adapted to be moved in timed relation to the movement of said traversing means to successively present printing characters at said confronting position, means for forming an impression from said characters on an inserted record at said confronting position when said traversing means abuts against a sensing pin projected through said guide openings and a record perforation, and means to bodily reciprocate said bodily reciprocable block, move the traversing means, move the printing device and actuate the impression forming means in each cycle of operation.

2. In a device for interpreting records having an array of perforations formed therein, first and second guide means forming a slot to receive a perforated record, said guide means having aligned openings adapted to coincide with the array of perforations in a record, sensing means for sensing the perforations in a record positioned in said guide means, said sensing means comprising a bodily reciprocable block yieldingly holding sensing pins at one side of said first guide means, said pins being aligned with the openings in said guide means and being adapted to protrude through aligned openings of said guide means when a record perforation coincides therewith, said sensing means further including means at the outer side of said second guide means adapted to traverse said second guide means and having portions cooperating with the raised sensing pins in the block, said pins being adapted to be moved with respect to the bodily reciprocable block when no record perforations are coincident therewith, a rotatable character drum having a plurality of printing characters thereon positioned adjacent the innermost end of said slot and in confronting relation with a part of the inner end of an inserted record and adapted to be moved in timed relation to the movement of said traversing means to successively present printing characters at said confronting position, means for forming an impression from said characters on an inserted record at said confronting position when said traversing means abuts against a sensing pin projected through said guide openings and a record perforation, and means to bodily reciprocate said bodily reciprocable block, move the traversing means, rotate said character drum and actuate the impression forming means in each cycle of operation.

3. In a device for interpreting records having an array of perforations formed therein, first and second guide means forming a slot to receive a perforated record, said guide means having aligned openings adapted to coincide with the array of perforations in a record, sensing means for sensing the perforations in a record positioned in said guide means, said sensing means comprising a bodily reciprocable block yieldingly holding sensing pins at one side of said first guide means, said pins being aligned with the openings in said guide means and being adapted to protrude through aligned openings of said guide means when a record perforation coincides therewith, said sensing means further including means at the outer side of said second guide means adapted to traverse said second guide means and having portions cooperating with the raised sensing pins in the block, said pins being adapted to be moved with respect to the bodily reciprocable block when no record perforations are coincident therewith, a rotatable character drum positioned adjacent the innermost end of said slot and in confronting relation with a part of the inner end of an inserted record and adapted to be rotated in timed relation to the movement of said traversing means, a character ring having printing characters thereon frictionally mounted for rotation with said drum, means under control of said traversing means for holding said ring against rotation with said drum when said traversing means abuts against a sensing pin projecting through said guide openings and a record perforation, means for forming an impression from said characters on an inserted record at said confronting position, and means to bodily reciprocate said bodily reciprocable block, move the traversing means, rotate said drum and actuate the impression forming means in each cycle of operation.

4. In a device for interpreting records having an array of perforations formed therein, first and second guide means forming a slot to receive a perforated record, said guide means having aligned openings adapted to coincide with the array of perforations in a record, sensing means for sensing the perforations in a record positioned in said guide means, said sensing means comprising a bodily reciprocable block yieldingly holding sensing pins at one side of said first guide means, said pins being aligned with the openings in said guide means and being adapted to protrude through aligned openings of said guide means when a record perforation coincides therewith, said sensing means further including a plurality of pin feelers at the outer side of said second guide means adapted to traverse separate, adjacent zones of said second guide means and each having portions cooperating with the raised sensing pins in the block, said pins being adapted to be moved with respect to the bodily reciprocable block when no record perforations are coincident therewith, a movable printing device having a plurality of printing characters thereon positioned adjacent the innermost end of said slot and in confronting relation with a part of the inner end of an inserted record and adapted to be moved in timed relation to the movement of said pin feelers to successively present printing characters at said confronting position, common means controlled by each of said pin feelers for holding a printing character at said confronting position when any one of said pin feelers abuts against a sensing pin projecting through said guide openings and a record perforation, means for forming an impression from said characters on an inserted record at said confronting position, and means to bodily reciprocate said bodily reciprocable block, move the traversing means, move the printing device and actuate the impression forming means in each cycle of operation.

5. In a device for interpreting records having an array of perforations formed therein, first and second guide means forming a slot to receive a perforated record, said guide means having aligned openings adapted to coincide with the array of perforations in a record, a plurality of movable printing devices each having a plurality of printing characters thereon positioned adjacent the innermost end of said slot and in confronting relation with a part of the inner end of an inserted record, sensing means for sensing the perforations in a record positioned in said guide means, said sensing means comprising a bodily reciprocable block yieldingly holding sensing pins at one side of said first guide means, said pins being aligned with the openings in said guide means and being adapted to protrude through aligned openings of said guide means when a record perforation coincides therewith, said sensing means further including separate means for each of said printing devices at the outer side of said second guide means adapted to traverse said second guide means and having portions corresponding with the raised sensing pins in the block, said pins being adapted to be moved with respect to the bodily reciprocable block when no record perforations are coincident therewith, said printing devices being adapted to be moved in timed relation to the movement of said traversing means to successively present printing characters at said confronting position, means under control of each of said traversing means for positioning a printed character at said confronting position when such traversing means abuts against a sensing pin projecting through said guide openings and a record perforation, means for forming an impression from said characters on an inserted record at said confronting position, and means to bodily reciprocate said bodily reciprocable block, move the traversing means, move the printing devices and actuate the impression forming means in each cycle of operation.

6. In a device for interpreting records having an array of perforations formed therein, first and second guide means forming a slot to receive a perforated record, said guide means having aligned openings adapted to coincide with the array of perforations in a record, sensing means for sensing the perforations in a record positioned in said guide means, said sensing means comprising a bodily reciprocable block yieldingly holding sensing pins at one side of said first guide means, said pins being aligned with the openings in said guide means and being adapted to protrude through aligned openings of said guide means when a record perforation coincides therewith, said sensing means further including a plurality of devices at the outer side of said second guide means adapted to traverse in unison said second guide means and having portions cooperating with the raised sensing pins in the block, said pins being adapted to be moved with respect to the bodily reciprocable block when no record perforations are coincident therewith, a rotatable drum positioned adjacent the innermost end of said slot and in confronting relation with a part of the inner end of an inserted record adapted to be moved in timed relation to the movement of said traversing devices, a character ring for each of said traversing devices having printing characters thereon frictionally mounted for rotation with said drum, means under control of said traversing devices upon abutment thereof against a sensing pin projecting through said guide openings and a record perforation for holding the respectively related character rings against rotation with said drum, means for forming an impression from said characters on an inserted record at said confronting position, and means to bodily reciprocate said bodily reciprocable block, move the traversing means, rotate said rotatable drum and actuate the impression forming means in each cycle of operation.

No references cited.